United States Patent [19]

Andes et al.

[11] Patent Number: 4,951,239

[45] Date of Patent: Aug. 21, 1990

[54] ARTIFICIAL NEURAL NETWORK IMPLEMENTATION

[75] Inventors: David K. Andes; Robert A. Licklider; Donald H. Witcher; Richard M. Swenson, all of Ridgecrest, Calif.

[73] Assignee: The United States of America as represented by the Secretary of the Navy, Washington, D.C.

[21] Appl. No.: 263,455

[22] Filed: Oct. 27, 1988

[51] Int. Cl.⁵ .................... G06C 7/12; G06C 7/163
[52] U.S. Cl. ................................ 364/807; 307/201; 364/513
[58] Field of Search ............... 364/800, 807, 276.6, 364/931.3, 600, 602, 513; 307/201

[56] References Cited

U.S. PATENT DOCUMENTS

| 3,601,811 | 8/1971 | Yoshino | 364/900 |
| 3,950,733 | 4/1976 | Cooper et al. | 307/201 |
| 4,773,024 | 9/1988 | Faggin et al. | 364/513 |

OTHER PUBLICATIONS

Goser, K. et al., "Intelligent Memories in VLSI", *Information Sciences* 34 (Elsevier), pp. 61–82, 1984.
Wang, S., "On the I-V Characteristics of Floating-Gate MOS Transistors", IEEE Trans. on Electron Devices, vol. ED-26, No. 9, Sep. 1979, pp. 1292–1294.
Sage, J. et al., "An Artificial Neural Network Integrated Circuit Based on MNOS/CCD Principles", *AIP Conf. Proc.* 151–*Neural Networks for Computing*, pub. by American Institute of Physics, 1986, pp. 381–385.
Bibyk, S. et al., "Issues in Analog VLSI and MOS Techniques for Neural Computing", in *Analog VLSI Implementation of Neural Systems*, Mead, C. et al., eds., pub. Kluwer Academic, 1989, pp. 103–133.

*Primary Examiner*—Jerry Smith
*Assistant Examiner*—Stephen M. Baker
*Attorney, Agent, or Firm*—Sol Scheinbein; Melvin J. Sliwka; Stephen J. Church

[57] ABSTRACT

An artificial neural network having analog circuits for simultaneous parallel processing using individually variable synaptic input weights. The processing is implemented with a circuit adapted to vary the weight, which may be stored in a metal oxide field effect transistor, for teaching the network by addressing from outside the network or for Hebbian or delta rule learning by the network itself.

7 Claims, 6 Drawing Sheets

ARTIFICIAL NEURAL NETWORK IMPLEMENTATION

BACKGROUND OF THE INVENTION

1. Field of the Invention

The present invention pertains to the field of pattern recognition. More particularly, the invention pertains to adaptive pattern recognizers capable of supervised or unsupervised learning.

2. Background of the Invention

Artificial neural networks having parallel, distributed processing have been widely proposed and have been simulated by serial or partially parallel, digital systems. It has long been recognized that fully parallel distributed processing would offer advantages such as extremely fast overall processing with relatively slow elements, effective functioning with deficient or even inoperable elements, recognition of patterns by learning from prototypes without programming, and little functional degradation by noisy input.

Some well-known neural network models will now be described as background for their implementation by the present invention. Typically, neural networks are modeled in a layered architecture. A first group of neurons or neural units serves as an input layer and propagates signals to another group in an intermediate layer. Signals from the intermediate layer then influence one or more succeeding layers.

Ultimately, signals are provided by an output layer which may be the second or, commonly, the third layer. In the general case every signal from one layer is connected to an input or synapse of the next layer, and "learning" is considered to occur by varying at each synapse the "weight" given to the signal received thereat. Each synapse may have an excitatory or inhibitory effect. All of the weighted signals received by the synapse of a neuron determine its activation, or output signal strength, in accordance with some function. The function is, typically, assumed to be a sigmoid, or S-shaped, with a lower excitatory threshold below which to significant activation occurs with reduction in excitatory input and with an upper excitatory threshold above which there is no significant increase in activation with increase in excitatory input.

It is apparent that such a network may be defined mathematically with signals and neurons of connected layers identified by subscripts corresponding to the layers. It is also apparent that each layer may be represented as a rectangular array with each synapse identified by Cartesian coordinates specifying the neuron and the particular synapse of a neuron. Using this approach, the activation of a neuron j is represented by a real number $O_j$. The effectiveness or weight of the synaptic connection from neuron j to neuron i is also represented by a real number $w_{ij}$ which may varied as the network is "taught" or "learns". The input to neuron i ($I_i$) is then $\Sigma w_{ij} O_j$. The output ($O_i$) of the neuron is a function of its inputs as represented by $$O_i = F(I_i) = F(\Sigma w_{ij} O_j),$$

where F is the above-mentioned sigmoidal function.

It is well-known that a neural network provided with predetermined input signals may be taught to provide a corresponding and desired output signal by addressing each weight and varying it with an appropriate amount $\Delta w_{ij}$.

It is also known that a neural network may itself "learn" if $\Delta w_{ij}$ of each synapse is appropriately determined by the input $O_j$ to the synapse and by either the output $O_i$ of the corresponding neuron or by an "error" signal $\delta_i$ back propagated from the layer to which $O_i$ is propagated.

Thus in "Hebbian" learning if $O_j$ and $O_i$ are both active, the $w_{ij}$ is increased. Mathematically, this may be represented by $$\Delta w_{ij} = G\, O_i\, O_j,$$

where G is a gain term used to control the rate of learning.

However, in "delta rule" learning the weight at each synapse is modified as represented by $$\Delta w_{ij} = G\, \delta_i\, O_j,$$

where G is as above, $\delta_i$ is the back propagated error signal to the ith level neuron with the synapse, and $O_j$ is the jth level output thereto. Error signals are then recursively back propagated as represented by $$\delta_j = F'(I_j)\, \Sigma w_{ij}\, \delta_i$$

where $\delta_j$ is the error signal to the neuron providing the $O_j$; where $F'(I_j)$ represents the derivative of the above described function F of the jth neuron applied to the sum of the weighted inputs thereto: and $\Sigma w_{ij}\, \delta_i$ is the sum of the weights of each ith synapse applied to the corresponding error signals propagated thereto from the layer to which the ith layer propagates. At each neuron, the argument of F for forward propagation and F' for backward error propagation is the same.

SUMMARY OF THE INVENTION

The present invention involves the implementation of an artificial neural network by analog elements for simultaneously weighting the inputs to each neural unit of the network by individually variable factors. Specifically, the invention involves the retention and variation of such factors by floating gate metal oxide field effect transistors. More generally, the invention resides in a neural unit circuit adapted to variation of the factors upon their addressing from outside the network or to variation of the factors by the network itself for Hebbian or delta rule learning.

It is an object of the invention to provide analog devices for truly parallel and distributed information processing by an artificial neural network.

Another object is to provide such devices for implementing teaching or learning in such a network by various schemes.

Another object is to provide such devices particularly adapted for high yield construction as integrated circuits.

Still another object is to provide such devices providing high speed, fault tolerant, and noise insensitive pattern recognition.

BRIEF DESCRIPTION OF THE DRAWINGS

Other objects, advantages, and novel features of the present invention will become apparent from the following detailed description when considered with the accompanying drawings in which.

DESCRIPTION OF THE PREFERRED EMBODIMENT

Figure 1:
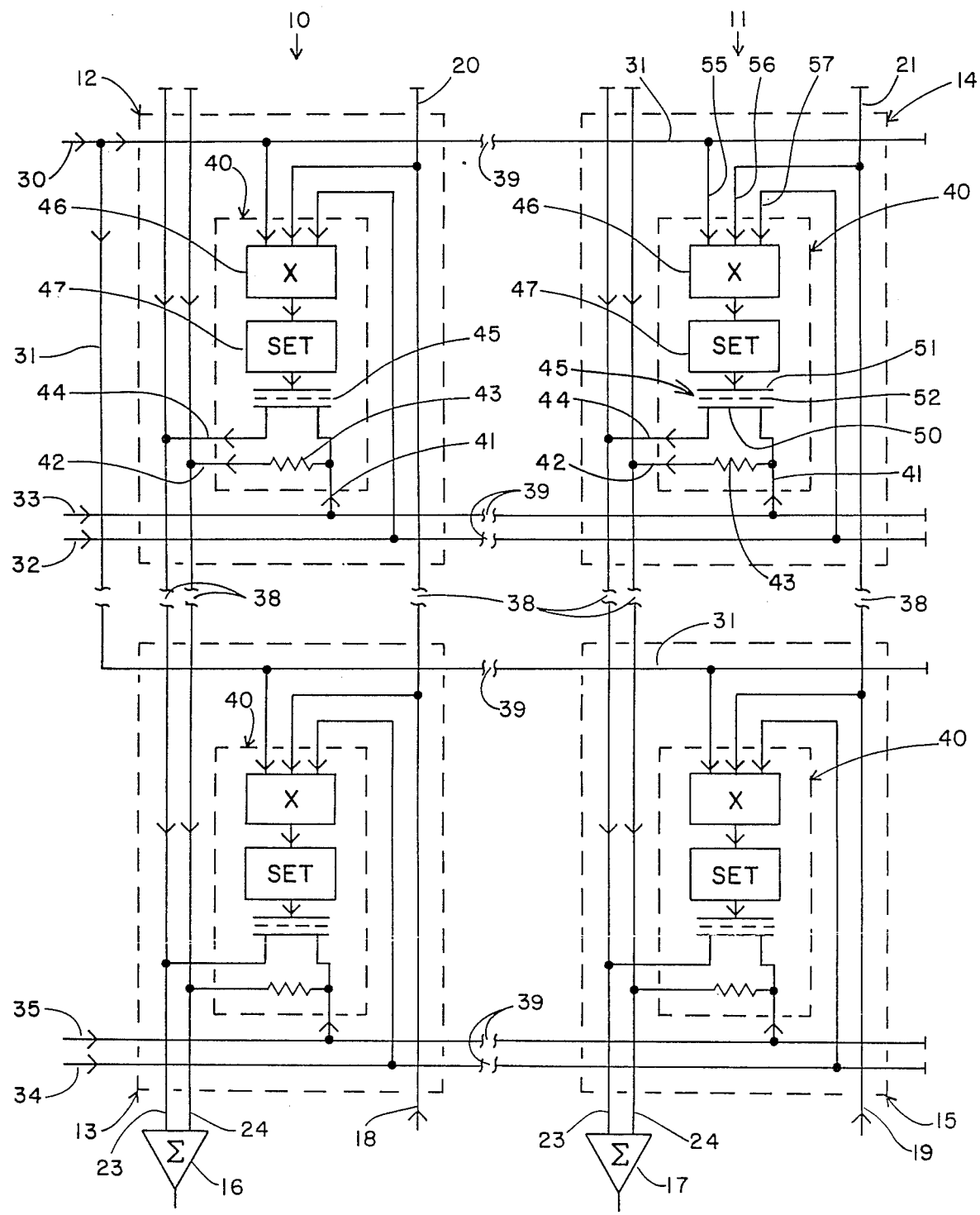
FIG. 1 is a block diagram of neural unit circuits of the present invention arranged for variation of weights stored in the circuits by external addressing.

In FIG. 1 is shown two neural units or neurons 10 and 11 each embodying principles of the present invention and each representative of such a unit referred to in the claims as a "second neural unit." Units 10 and 11 are arranged in a manner representative of such units connected in a layer of an artificial neural network in which signal weights stored in four substantially identical synapse circuits 12, 13, 14 and 15 of the units are modifiable for training the network using select and weight signals provided externally to the network. Unit 10 includes circuits 12 and 13 and a summing circuit 16, and unit 11 includes circuits 14 and 15 and a summing circuit 17. Units 10 and 11 have respective unit select inputs 18 and 19 from which corresponding conductors 20 and 21, each sometimes referred to in the claims as a "first common conductor", extend through the associated unit. Each unit has a positive weighted signal conductor 23 and negative weighted signal conductor 24 extending through the unit and connected to each summing circuit 16 or 17.

The layer has a gain terminal 30 which is connected to each circuit 12-15 by a common gain conductor 31. Circuits 12 and 14 are associated with an input select conductor 32 and a signal input conductor 33, and circuits 13 and 15 are associated with corresponding conductors 34 and 35, each conductor 32-35 corresponding to a "second common conductor" sometimes referred to in the claims.

An artificial neural layer for practical recognition of images or the like would, of course, have many more than two neural units such as units 10 and 11 and each unit would have many more than two synapse circuits such as circuits 12-15. However, the number of similar layers and circuits in herein described arrangements thereof is reduced to the minimum required for explanation of practically functional connections between the units and circuits. It will be apparent from breaks 38 in conductors 21-24 that these conductors may link more than two synapse circuits such as circuits 12-15 in each unit such as 10. It is also apparent from breaks 39 in conductors 32-35 that many more than two such neural units may be linked thereby in a neural network layer.

Synapse circuits 12-15 have individual and substantially identical factoring circuits 40. Each circuit 40 has, as indicated for circuit 14, a signal input 41, a bias or negative signal output 42 connected directly to input 41 by a bias resistor 43, and a weighted signal output 44 connected to input 41 through a floating gate, metal oxide field effect transistor (MOSFET) 45. Each circuit 40 also includes a multiplier 46, and a weight setting circuit 47.

Transistor 45 includes, as indicated for circuit 14, a signal channel 50 which has a source connected to input 41 and has a drain connected to output 44, includes a weighting channel 51, and includes a floating gate 52 receptive to a charge which may increased or decreased in any suitable manner by an appropriate voltage provided to channel 51 by circuit 46 to control the current from input 41 to output 44. Multiplier circuit 46 outputs to setting circuit 47 any suitable signal representing the signed product of three signals provided individually to a first input 55, a second input 56 and a third input 57 of the multiplier. For each circuit 40, multiplier input 55 is connected to gain input 30, multiplier input 56 is connected to the corresponding conductor 20 or 21, and multiplier input 57 is connected to the corresponding conductor 33 or 35.

Figure 2:
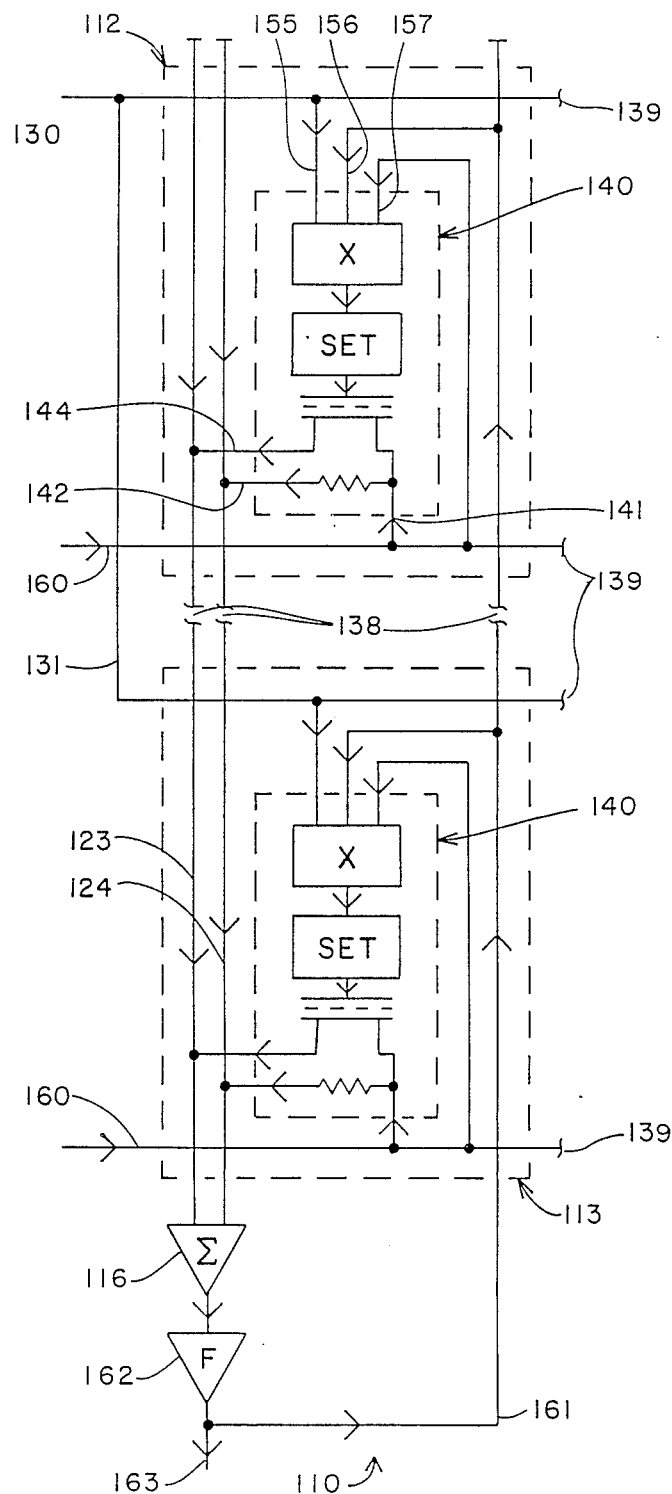
FIG. 2 is a diagram of circuits similar to those of FIG. 1 but arranged for Hebbian learning.

FIG. 2 shows a neural unit 110 of the present invention arranged in a manner representative of such a unit for use in a layer of an artificial neural system with Hebbian learning. In FIG. 2 elements corresponding to those in FIG. 1 are identified by numerals having a value one hundred higher than those of the FIG. 1 elements. Unit 110 has synapse circuits 112 and 113, a summing circuit 116 connected to a positive weighted signal conductor 123 and to a negative weighted signal conductor 124, a gain terminal 130 and a gain conductor 131, and may be used with additional such synapse circuits and neural units as indicated respectively by breaks 138 and 139. Each circuit 112 and 113 includes a factoring circuit 140 which is substantially identical to a circuit 40 and which has, as indicated for circuit 112 a signal input 141, a bias signal output 142, a weighted signal output 144, a first multiplier input 155 connected to terminal 130, a second multiplier input 156, and a third multiplier input 157. Unit 110 is distinguished from unit 10 in that unit 110 has a pair of signal input conductors 160 individual to circuits 112 and 113 and to a corresponding one of such circuits of other neural units of the same layer. At each circuit 112 or 113, the corresponding conductor 160 is connected both to the signal input 141 and to the third multiplier input 157. Unit 110 has a conductor 161 which extends through synapse circuits 112 and 113 and is connected to both of their multiplier inputs 156. Unit 110 is particularly distinguished from circuit 10 in that the output of summing circuit 116 is provided to an activation function generator 162 whose output is sigmoidal in relation to the output of summing circuit 116. The output of generator 162 is provided to conductor 161 and to a signal output 163 of unit 110.

Figure 3:
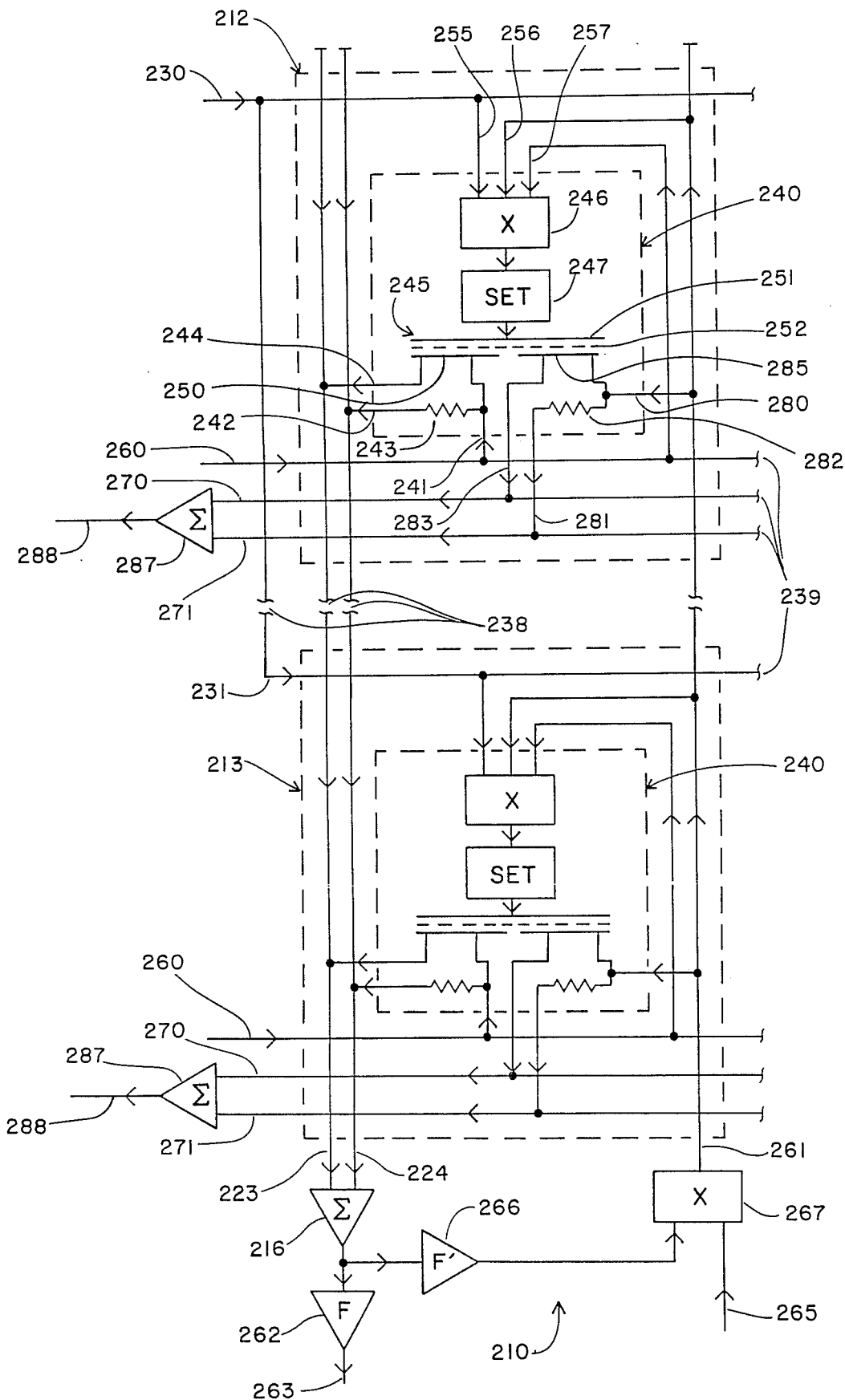
FIG. 3 is a diagram of similar circuits arranged with additional elements for delta rule learning.

FIG. 3 shows a neural unit 210 of the present invention arranged in a manner representative of such a unit for use in a layer of an artificial neural network with delta rule learning. Elements in FIG. 3 corresponding to those in FIGS. 1 or 2 are identified by numerals having a value two hundred or one hundred higher, respectively, than those of the FIGS. 1 or FIG. 2 elements. Unit 210 has synapse circuits 212 and 213, an output summing circuit 216 connected to a positive weighted output conductor 223 and to a negative weighted output conductor 224, a gain terminal 230 and a gain conductor 231, and may be used with other synapse circuits and neural units as indicated, respectively by breaks 238 and 239. Circuits 212 and 213 each include a factoring circuit 240 having an information signal input 241, an information bias signal output 242, a bias resistor 243, a weighted information signal output 244, a multiple channel, floating gate MOSFET 245, a multiplier 246, and a setting circuit 247. As shown for circuit 212, MOSFET 245 has an information channel 250, a setting channel 251 and a floating gate 252. Multiplier 246 has first, second, and third inputs respectively indicated by numerals 255, 256 and 257. Multiplier 246, circuit 247 and channel 251 function similarly to the corresponding elements of unit 10 to weight a signal to input 241. Unit 210 has a pair of information signal inputs 260, which are individual to circuits 212 and 213 and are connected to their respective inputs 241 and 257, and has a conductor 261 which is connected to inputs 256 of both circuits 212 and 213. Unit 210 has an activation function generator 262 which receives the output of circuit 216, performs a sigmoidal function on this output, and outputs to an information signal output 263 of the unit.

Unit 210 is distinguished from units 10 and 110 in having an input 265 for a first or input error signal, a derivative function generator 266, and an error multiplier 267. Derivative function generator 266 receives, together with activation function generator 262, the output of summing circuit 216 and outputs a derivative signal which corresponds to the derivative of the sigmoidal function provided by function generator 262. This derivative signal and the error signal from input 265 are provided to multiplier 267 which outputs an error product signal to conductor 261.

Unit 210 is also distinguished from units 19 and 119 in having a pair of positive weighted error signal conductors 270 and a pair of negative weighted error signal conductors 271. One conductor 270 and one conductor 271 extend through each synapse circuit 212 and 213 and through each synapse circuit of other neural units, not shown in FIG. 3, through which extends the same one of the conductors 260 as extends through the circuit 212 or 213.

Unit 210 is further distinguished from circuits 10 and 110 in that each factoring circuit 240 has, as indicated in circuit 212, an error product signal input 280, an error bias signal output 281 connected thereto by an error bias resistor 282, and a weighted error signal output 283. Input 280 is connected to conductor 261, and outputs 281 and 283 are connected, respectively, to conductors 271 and 270 MOSFET 245 has an error channel 285 whose source is connected to input 280 and whose drain is connected to output 283. Channel 285 is controlled by floating gate 252, which also controls channel 250, so that the same relative weight and variations thereto are provided to a signal received on input 280 as to a signal received on input 241. Each circuit 212 or 213 is associated with an error summing circuit 287 having as inputs the corresponding conductor 270 and conductor 271 and outputting the sum of the signals thereon as a second or error output signal on one of a pair of error outputs 288 of unit 210.

Figure 4A:
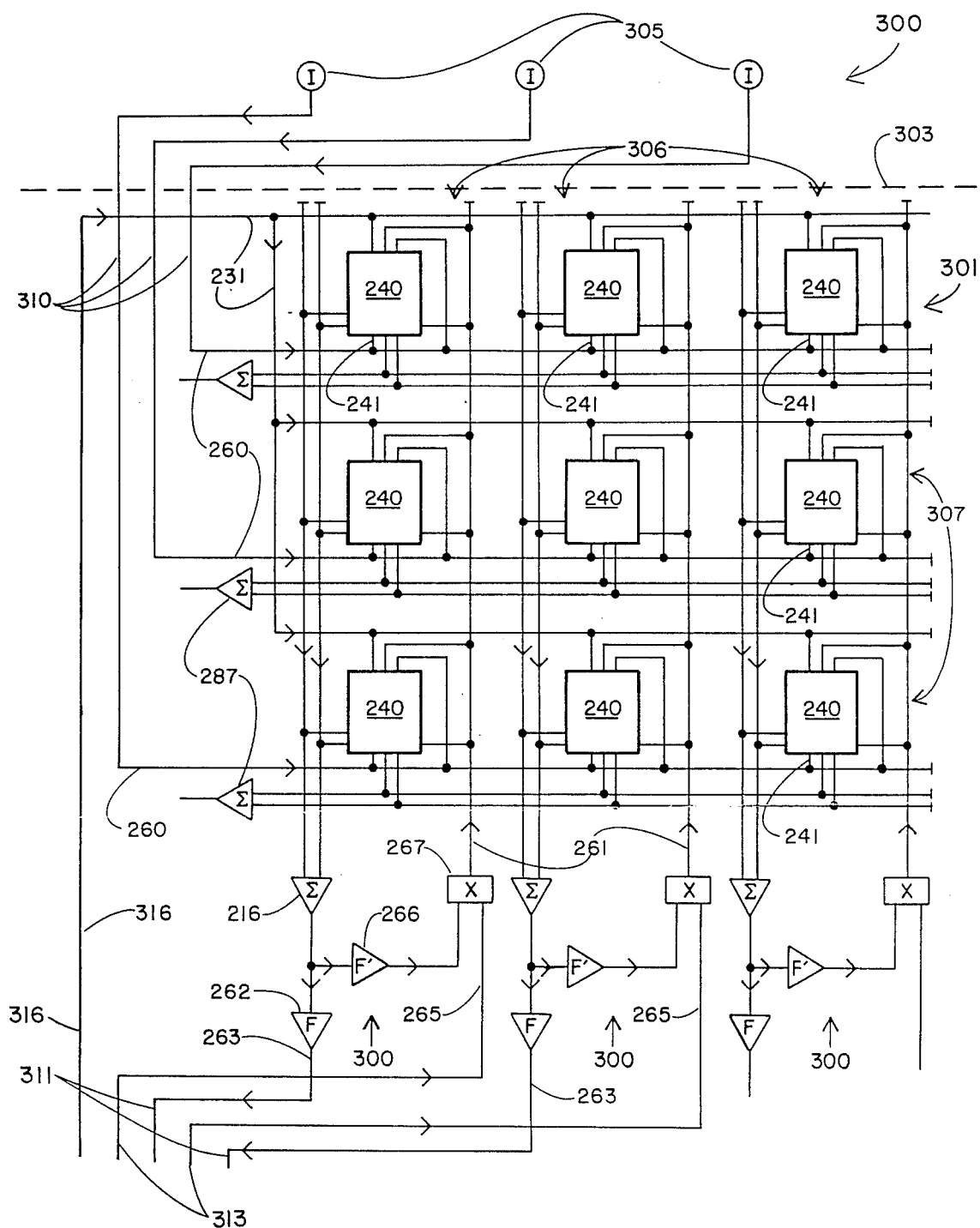
FIGS. 4A and 4B are a diagram of a number of the circuits of FIG. 3 connected in an artificial neural network.
Figure 4B:
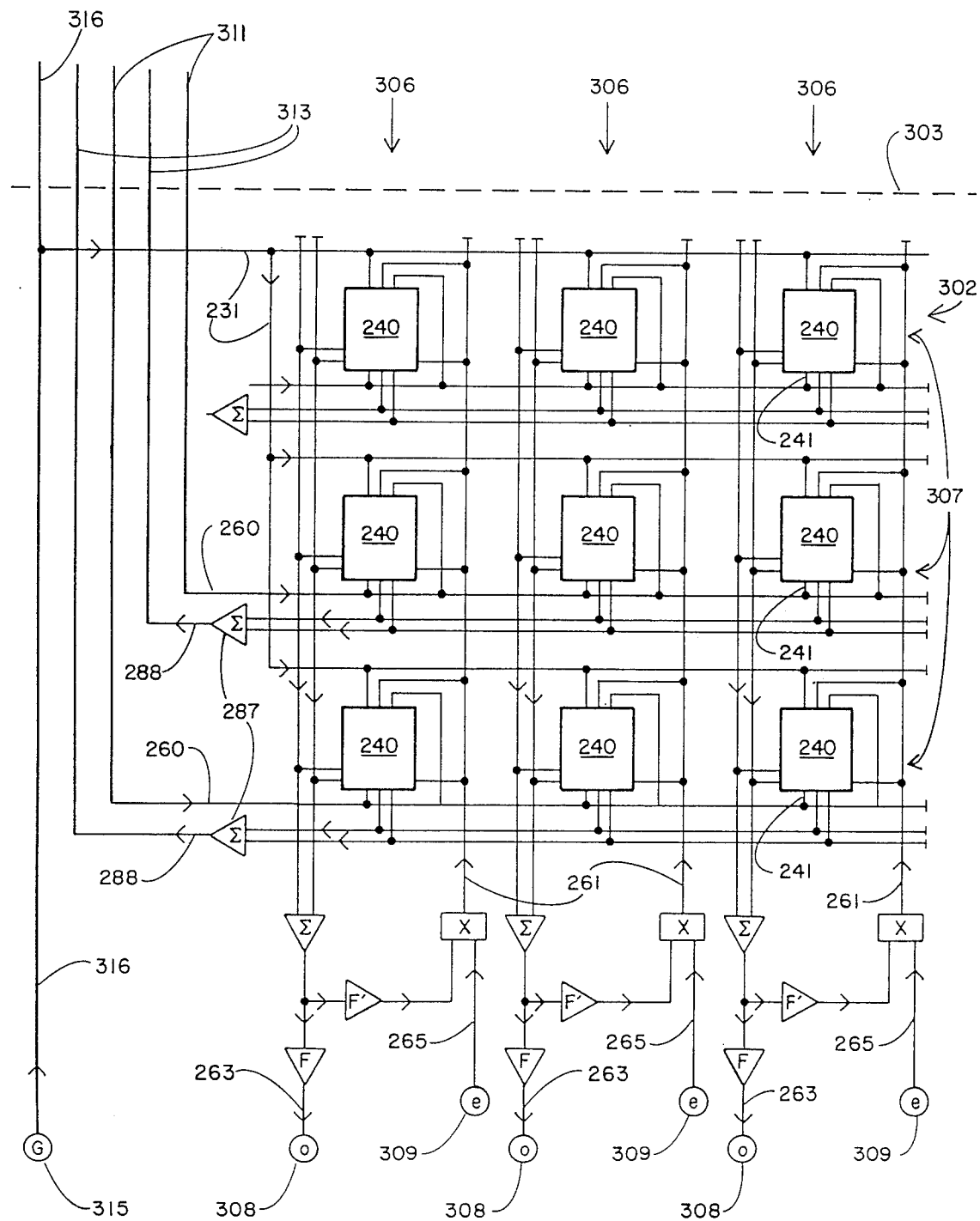

FIGS. 4A and 4B show an artificial neural network arranged for delta rule learning with elements substantially identical to those of FIG. 3 identified by the same number. The network of FIGS. 4A and 4B has an input layer 300, a central or hidden layer 301, and an output layer 302, the boundaries between these layers being indicated by dash lines 303. Each layer has, conceptually, three neural units. The units of layer 300 consist only of three information signal inputs 305 for the network, while layers 301 and 302 consist of three active neural units 306 each corresponding to a unit 210. Each unit 306 has three synapse circuits 307.

Each circuit 307 is substantially identical to one of the circuits 212 or 213 and thus includes one of the factoring circuits 240 having a multiple channel, floating gate MOSFET 245, the MOSFET being omitted for simplicity in FIGS. 4A and 4B.

Layers 301 and 302 are thus each a three by three matrix of synapse circuits 307 with each column of the matrix corresponding to a unit 306 and each row corresponding to the three synapse circuits through which a conductor 260 extends. To show the flexibility possible in an artificial neural network of the present invention, the unit 306 depicted at the right of layer 301 is unused so that the network consists of, effectively, an input layer of three neural units, a central layer of two neural units, and an output layer of three neural units.

In layer 302, the network has three information signal outputs 308 individually connected to the outputs 263 of the three units 306 of this layer and has three corresponding error signal inputs 309 individually connected to the error inputs 265 of these three units. The network has three conductors 310 individually connecting the first layer inputs 305 with the conductors 260 of layer 301. Inputs 305 are thus individually connected with the inputs 241 of the synapse circuits 307 of each unit 306 of the layer. Similarly, the outputs 263 of the two functional units of layer 302 are individually connected by two conductors 311 to the lower two conductors 260 of layer 302 so that outputs 263 are individually connected to the inputs 241 of the lower two synapse circuits 307 of each neural unit 306 of this layer. The network has two conductors 313 which individually connect the error signal outputs 288 of such two lower synapse circuits of the layer 302 neural units with the error inputs 263 of the same two layer 306 neural units to which conductors 311 connect. In accordance with delta rule learning, the error signal from a layer 302 synapse circuit row is thus propagated to the layer 301 synapse circuit column which provides information signals to this row. The network has an external gain terminal 315 connected by a conductor 316 to the gain conductors 231 of each layer so that, as may be seen from FIGS. 3, 4A, and 4B, terminal 315 is connected to the first input 255 of every multiplier 246 of the network.

Figure 5:
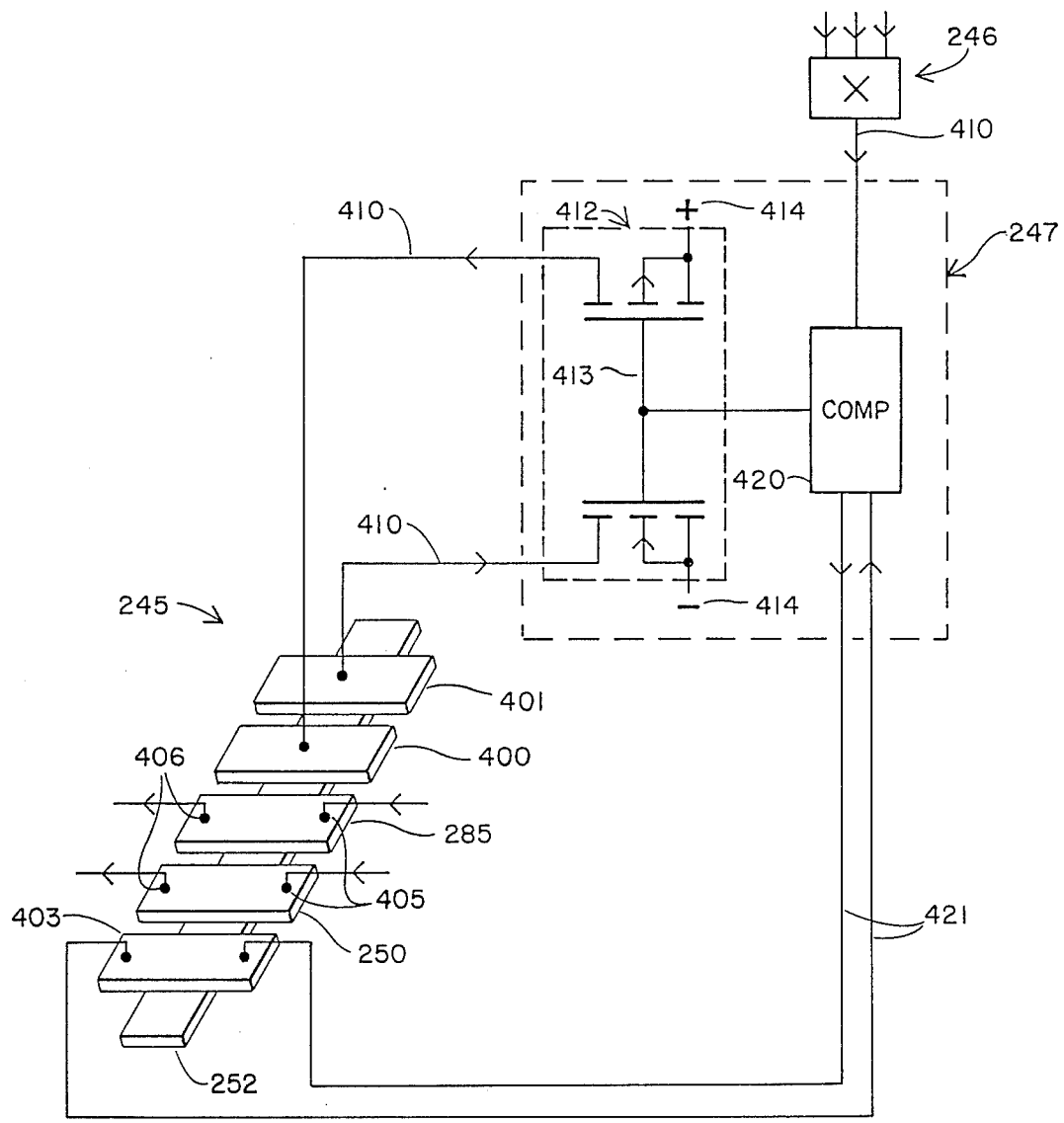
FIG. 5 is an isometric view of a multiple channel, floating gate metal oxide field effect transistor, which is advantageous in the circuits of FIGS. 1-4, with associated elements which are diagrammatically represented.

FIG. 5 shows multiplier 246 and details of MOSFET 245 and setting circuit 247. It will be seen that MOSFET 245 has, in addition to previously mentioned information signal channel 250 and error signal channel 285, a positive setting channel 400, a negative setting 401, and a charge measurement channel 403. Channels 400 and 401 are equivalent to the single setting channel 251. Channels 250, 285, 400, 401, and 403 are semiconducting and are formed in a substrate not shown and insulated by an oxide layer, also not depicted in FIG. 5. The channels are depicted as having the same width and thickness, but these dimensions may be different for different channels having differing functions. The materials and construction of MOSFET 245 are 25 similar to those well-known for electronically erasable MOSFET devices: however, insofar as known to the applicants previous such devices have only one channel and are not adapted for varying the charge on gate 252 to provide varying weights or factors for a signal connected to a source 405 of a channel such as channel 250 or 285, the weighted signal being provided at a drain 406 of the channel.

In setting circuit 251, the signed product from multiplier 246 is provided on a connection 410 thereof and, preferably, has a polarity corresponding to the product sign for use with an enhancement complementary metal oxide (CMOS) device 412 having a gate connection 413 which receives the product signal. Device 412 is connected to opposite polarity sources indicated by numeral 414 so that the source of the polarity corresponding to the product sign is applied by one of a pair of connections 416 from device 412 to the appropriate channel 400 or 401 with a voltage corresponding to the product value to vary the charge on gate 252 in the direction determined by the product sign. This construction of setting circuit 251 is thus effective in Hebbian and delta rule learning where the change in weight to be given to a signal on information channel 250 and error signal channel 285 is defined by the product signal from multiplier 246.

Setting circuit 251, typically, includes a comparator device 420 which is connected to channel 403 by connections 421 to measure the conductance thereof as determined by the charge on gate 252. Device 420 receives the product signal from multiplier 246 and is constructed in any suitable manner to control device 412 so that the change in conductance of channel 252, and thus the weights provided by channels 250 and 285, closely follow the changes defined by the product signal from multiplier 246 despite constructional variations between MOSFET's such as MOSFET 245.

OPERATION

The operation of the described embodiments of the present invention is believed clearly apparent, and will be briefly discussed at this point with reference to FIGS. 3 and 4 where it can seen that the plurality of neural units 306 of layer 301 provide a plurality of first output signals from outputs 263 individual to these units, these signals being provided individually to the inputs 241 of each synapse circuit 307 of each neural unit of layer 302. In each of these synapse circuits, a factor corresponding individually to their inputs 241 is stored by the corresponding gate 251. As a result, the signals from outputs 265 of layer 301 to inputs 241 of each layer 302 synapse circuit are simultaneously weighted by the corresponding factor to generate a plurality of weighted signals corresponding individually to these inputs and provided on outputs 244. In each neural unit 306 of layer 302 these weighted signals are then summed by conductors 223 and 224 and circuit 216 to provide a sum signal from which activation function generator 262 provides a second output signal on the output 263 of the layer 302 neural unit.

The factors mentioned in the preceding paragraph are individually variable by the operation, now to described, of certain elements of layer 301 or 302. The factors are stored individually by a charge on the floating gate 252 of one of the plurality of MOSFETS 345, each factor being stored in the gate associated with the input 241 receiving the signal to which the factor is applied so that the charge on the gate controls the corresponding channel 252. This channel is thus a weighting element receiving the output signal connected thereto from an output 263 of layer 301 and receiving the corresponding factor from the gate 252 of the MOSFET 245 having the channel. Multipliers 246 are individually connected to MOSFETS 245 and to inputs 241 thereto, so that setting circuits 247 serve to algebraically add the signed product from each multiplier to the factor stored in the corresponding gate 252. Each factor may thus be individually varied by appropriate signals provided to the inputs 255-257 of the multiplier 246 connected to the MOSFET 245 whose gate 252 bears a charge corresponding to the factor.

This individual varying of such factors is clearly apparent in FIG. 1 where application of a select signal level, which represents a large value at one of the multiplier inputs 55-57, to only one of the unit select conductors 20 or 21 and to only one of the input select conductors 32 or 34 causes the product output to be substantially zero from all multipliers 46 not connected to both conductors to which the large signal value is applied. As result, the charge on gates 52 corresponding to these multipliers in unchanged while the multiplier connected to both these conductors is "selected" and outputs a product signal corresponding to the value of a signal applied to gain terminal 30. An artificial neural network having layers arranged as in FIG. 1 may thus be trained by select signals applied to such select conductors and by a variable signal applied to a gain terminal.

The manner in which factors stored in circuits 140 of FIG. 2 are individually varied for Hebbian learning will now be pointed out. Each conductor 160 of a layer of an artificial neural network using such learning receives a first output signal from another layer of the network and this output signal is provided by the conductor 160 to the third multiplier input 156 and to the signal input 141 of each circuit 140 through which the conductor extends. Each conductor 161 of a Hebbian learning unit 110 provides the second multiplier inputs 157 of the unit with a second output signal from the output 163 of the unit itself. Each factor stored in a circuit 140 will then be varied in accordance with an individual product which is the product of such first and second output signals and of a gain signal provided to terminal 130 so that unit 110 functions for Hebbian learning.

For delta rule learning, factors stored in circuits 240 of FIGS. 3 and 4 are individually varied in a manner similar to that just described for Hebbian learning in that a gain signal is provided from terminal 315 to each first multiplier input 255, in that an output signal from layer 300 or 301 is provided from terminal 315 to each first multiplier input 255, and in that an output signal from layer 300 or 301 is provided by one of the conductors 260 to each third multiplier input 257 of layer 301 or 302. However for delta rule learning, a conductor 261 provides an error product signal to each second multiplier input 256 so that the output signal from each multiplier 246 is the product of such gain signals, output signal, and error signal.

In each synapse circuit 307 of each unit 306, the error channel 285, in effect, receives from the corresponding gate 252 the factor corresponding to the input 241 of the circuit and receives the error product signal corresponding to the unit from the conductor 261 thereof to generate a weighted signal on the error signal from the error channel on the output 288 of the circuit. In layer 302, each error summing circuit 287 and associated conductors 270 and 271 correspond individually to conductors 260 which provide output signals from layer 301. Circuits 287 and conductors 270 and 271 thus serve to sum the weighted error signals from those synapse circuits 307 connected at the inputs 241 thereof to each conductor 260 and serve to propagate the sum of the weighted error signals from the error outputs 288 of layer 302 to layer 301. As a result, the network of FIG. 4 functions for delta rule learning when a suitable gain signal is provided to terminal 315 and suitable error signals are provided to terminals 309 representing the differences between the outputs on the corresponding terminals 308 and desired outputs thereon.

Obviously, many modifications and variations of the present invention are possible in light of the above teachings. It is, therefore, to be understood that the invention may be practiced within the scope of the following claims other than as specifically described.

What is claimed is:

1. An artificial neural network comprising:
a first layer including a plurality of first neural units providing a plurality of first output signals individual thereto; and
a second layer including:
a plurality of second neural units, each second neural unit having
a plurality of inputs individually receiving said plurality of first output signals,
means for storing a plurality of factors corresponding individually to said inputs, said storing means having a plurality of metal oxide semiconductor field effect transistors individual to said inputs and each of said transistors having a floating gate storing the one of said factors for the corresponding input,
means for substantially simultaneously weighting each of said output signals received by said inputs by the corresponding factor to generate a plurality of weighted signals corresponding individually to said inputs, said weighting means including a plurality of channels individual to each of said transistors, each of said channels being controlled by such gate of the corresponding transistor for weighting the one of said output signals received by the corresponding input,
means for summing said weighted signals into a sum signal of the second neural unit, and
means for generating from said sum signal a second output signal in accordance with a predetermined activation function applied to the sum signal; and
means for varying said factors individually.

2. An artificial neural network comprising:
a first layer including a plurality of first neural units providing a plurality of first output signals individual thereto; and
a second layer including:
a plurality of second neural units, each second neural unit having,
a plurality of inputs individually receiving said plurality of first output signals,
means for storing a plurality of factors corresponding individually to said inputs,
means for substantially simultaneously weighting each of said output signals received by said inputs by the corresponding factor to generate a plurality of weighted signals corresponding individually to said inputs,
means for summing said weighted signals into a sum signal of the second neural unit, and
means for generating from said sum signal a second output signal in accordance with a predetermined activation function applied to the sum signal; and
means for varying said factors individually,
wherein in each of said second neural units:
said storing means includes a plurality of memory elements individual to said plurality of inputs for storing said factors corresponding thereto;
said weighting means includes a plurality of weighting elements individual to said plurality of inputs, each weighting element receiving the corresponding first output signal and receiving the corresponding one of said factors from the one of said memory elements corresponding thereto; and
said factor varying means includes
a plurality of multiplier means individual to said plurality of inputs, each multiplier means having a first input connection, a second input connection, a third input connection, and a product connection and providing thereat a signal corresponding to the signed product of signals received at said input connections of the multiplier means; and
a plurality of algebraic adding means individual to said multiplier means and to said memory elements, each of said adding means receiving the corresponding product signal and being connected to the corresponding memory element for adding said signed product to the factor stored therein,
and wherein;
the second layer has a gain conductor connected to each first input connection of said multiplier means;
each second neural unit has a first common conductor connected to each second input connection of said multiplier means of the neural unit; and
the second layer has a plurality of second common conductors, each second common conductor being connected to the third input connection of one of said multiplier means in each neural unit of the layer.

3. The network of claim 2 wherein said gain conductor, said first common conductors, and said second common conductors have individual terminals externally of the second layer:
so that each multiplier means is selectively addressable by a predetermined select signal provided to the first common conductor predetermined select signal provided to the first common conductor and to the second common conductor connected to the multiplier means; and
so that a variable signal provided to the gain conductor determines the product signal of an addressed multiplier means for addition by the corresponding adding means to the corresponding factor: for training the network by such select signals and such a variable signal.

4. The network of claim 2 wherein:
the gain conductor has a terminal external to the second layer:
such first common conductor of each second neural unit receives such second output signal thereof: and
each second common conductor receives the one of said plurality of first output signals received by the inputs of said second neural units which correspond to the ones of said multiplier means connected at said third connections thereof to the second common conductor,
so that the second layer functions for Hebbian learning with a gain signal provided to the gain conductor terminal.

5. The network of claim 2 wherein:

the gain conductor has a terminal external to the second layer;

each second common conductor receives the one of said plurality of first output signals received by the inputs of said second neural units which correspond to the ones of said multiplier means connected at said third connections thereof to the second common conductor:

each second neural unit receives a first error signal individual thereto and includes means for generating a derivative signal from the corresponding sum signal in accordance with a predetermined derivative function which is applied thereto and which is the derivative function of said activation function, means for generating an error product signal which corresponds to the product of said first error signal and said derivative signal, means for providing said error product signal to said first common conductor of the neural unit so that said product signal is received by the second input connection of each of said multiplier means which corresponds to an input of the second neural unit and so that the product added to the corresponding factor is proportional to the product of said error product signal, said one of the first output signals, and a gain signal provided to the gain terminal, and a plurality of error weighting means which are individual to said plurality of inputs of the second neural unit, receive the one of said factors corresponding to the one of said inputs to which the error weighting means corresponds, and receive the error product signal for said second common conductor, for weighting the error product signal by said one factor to provide a weighted error signal from each of said error weighting means, and the second layer has a plurality of error summing means, which are individual to each of said first output signals and which receive the weighted error signals provided by the error weighting means corresponding to the second neural unit inputs which receive the same first output signals, for summing said weighted output signals as a plurality of second error signals individual to the plurality error of summing means and for propagation to said first layer, so that the second layer functions for delta rule learning with such a first error signal provided to each second neural unit and with such a gain signal provide to the gain conductor terminal.

6. An artificial neural network comprising:
a plurality of first input signal conductors;
a plurality of neural units, each neural unit having
a first weighted signal conductor,
a plurality of synapse circuits, each synapse circuit corresponding to one of said first input signal conductors and having
a metal oxide semiconductor field effect transistor having a floating gate and a plurality of channels, each of said channels being controlled by a charge on said floating gate,
means for storing on said gate such a charge representing a factor corresponding to said synapse circuit,
means for connecting said one first input signal conductor to said weighted signal conductor through a first one of said channels to generate a first weighted signal representing the product of said factor and a signal on said one first input signal conductor,
a second input signal conductor,
a second weighted signal conductor, and
means for connecting said second input signal conductor to said second weighted signal conductor through a second one of said channels to generate a second weighted signal representing the product of said factor and a signal on said second input signal conductor; and
means connected to said first weighted signal conductor for generating a sum signal representing the sum of each said first weighted signal from said synapse circuits.

7. The artificial neural network of claim 6 wherein the network is adapted for delta rule learning and wherein:

each of said first input signal conductors of each of said neural units is an information input conductor so that said sum signal is an information sum signal of the neural unit;

each of said information input conductors is connected to said synapse circuits of each of said neural units;

said second weighted signal conductor is one of a plurality of weighted error signal conductors, each of said weighted error signal conductors corresponding to one of said information input conductors and being connected to each of said synapse circuits to which said one information input conductor is connected;

each of said neural units includes
means for generating from said information sum signal an information output signal in accordance with a predetermined activation function applied to said information sum signal,
means for generating a derivative signal from said information sum signal in accordance with a derivative function which is applied to said information sum signal and is the derivative function of said activation function of the neural unit,
means for receiving an input error signal, and
means for generating an error product signal representing the product of said derivative signal and said input error signal;

said second input signal conductor of each of said neural units is an error product signal conductor connected to each of said synapse circuits of the neural unit and receiving said error product signal of the neural unit, so that said second weighted signals generated by each of said synapse circuits to which one of said weighted error signal conductors is connected
are received by said one weighted error signal conductor, and
represent said error product signal of each of said neural units weighted by said factor corresponding to each of said synapse circuits to which said weighted error signal conductor is connected; and the network includes means connected to each of said weighted error signal conductors for generating an error output signal representing the sum of each of said second weighted signals generated by a one of said synapse circuits to which is connected the one of said information input conductors corresponding to the weighted error signal conductor.

* * * * *